United States Patent
Barz

(10) Patent No.: US 6,519,924 B1
(45) Date of Patent: Feb. 18, 2003

(54) BOUGH ROPING MACHINE

(76) Inventor: Daniel Barz, N 1997 Forks Rd., Merrill, WI (US) 54452

( * ) Notice: Subject to any disclaimer, the term of this patent is extended or adjusted under 35 U.S.C. 154(b) by 0 days.

(21) Appl. No.: 09/882,392

(22) Filed: Jun. 18, 2001

(51) Int. Cl.[7] .................................................. D07B 3/04
(52) U.S. Cl. ..................................... 57/18; 57/6; 57/10
(58) Field of Search ........................... 57/1 R, 3, 4, 6, 57/10, 16, 17, 18; 428/7, 10, 542.2, 542.6

(56) References Cited

U.S. PATENT DOCUMENTS

| | | |
|---|---|---|
| 1,585,357 A | 5/1926 | Anderson |
| 2,613,139 A | 10/1952 | Herold et al |
| 2,993,332 A | 7/1961 | Hughes |
| 2,998,668 A | 9/1961 | Guckelberg et al. |
| 3,284,995 A | 11/1966 | Haight |
| 3,344,592 A | 10/1967 | Geisinger |
| 3,590,567 A | 7/1971 | Bonikowski |
| 3,643,416 A | 2/1972 | Andrews et al. |
| 3,780,514 A | 12/1973 | Rodermund et al. |
| 3,942,310 A | 3/1976 | Rodermund et al. |
| 3,997,122 A * | 12/1976 | Helfand et al. ............. 242/159 |
| 4,250,701 A * | 2/1981 | Schwartz et al. ............. 57/18 |
| 4,277,885 A | 7/1981 | Scudder |
| 4,964,932 A | 10/1990 | Miller |
| 5,194,063 A | 3/1993 | Kalm et al. |
| 5,247,729 A | 9/1993 | Carmichael |
| 5,421,140 A | 6/1995 | Theriault |
| 5,791,134 A * | 8/1998 | Schneider et al. ............. 57/11 |
| 5,829,490 A | 11/1998 | Kilbane |

* cited by examiner

*Primary Examiner*—John J. Calvert
*Assistant Examiner*—Shaun R Hurley
(74) *Attorney, Agent, or Firm*—Tipton L. Randall

(57) ABSTRACT

An evergreen bough roping machine is disclosed. The device includes a spool support member for rotatably holding a spool of wrapping wire used to fasten boughs to a core wire thereby producing an evergreen garland. The separation of the spool of wrapping wire from a rotating planar disk member, which feeds the wrapping wire to encircle the boughs and core wire, allows for longer production runs before replenishment of the wrapping wire spool.

21 Claims, 9 Drawing Sheets

BOUGH ROPING MACHINE

CROSS-REFERENCE TO RELATED APPLICATIONS, IF ANY

Not applicable.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates to a device for making evergreen bough garlands and, more particularly, to a device for continuously fastening multiple evergreen boughs to a wire to form a garland of extended length.

2. Background Information

It is common practice for municipalities, corporations and even individuals to put up decorations during the Christmas season. One popular decoration is a garland made up of individual evergreen boughs fastened together in a long string and supported in an elevated location. The manufacture of these evergreen bough garlands is labor intensive when done by hand. Individuals have devised a variety of mechanical devices to automate the garland fabrication process.

A number of patents have been granted for devices for fastening boughs together to make garlands or wreaths. Anderson, in U.S. Pat. No. 1,585,357, discloses a chenille making machine where thread spools are mounted on a rotating disk with the thread feeding into a central core where the chenille is fabricated.

Herold et al., in U.S. Pat. No. 2,613,292, describe a crimping machine for producing a convoluted ornament from a strip of paper, cellophane or metal foil and a central cord.

In U.S. Pat. No. 2,993,332, Hughes discloses an evergreen roping machine that has a winding head assembly with a wheel that holds a spool of wire that feeds the wire to a projecting needle arm. The wheel rotates to wrap the wire around evergreen boughs on a twine.

U.S. Pat. No. 3,284,995 by Haight discloses a device for wrapping wire strands around a bundle of fibers. A winding wheel has a central aperture through which the bundle passes. The wheel has several spools that supply the cord that wraps the bundle. In U.S. Pat. No. 3,344,592, Geisinger describes a similar framework that carries spools of wire that are wound around a hose.

Bonikowski et al., in U.S. Pat. No. 3,590,567, describe an apparatus for controlling tension in flexible material being wrapped about an elongated core such as a tube or pipe. In U.S. Pat. No. 3,643,416, Andrews et al. disclose a device for wrapping a bundle of filaments with yarn supplied on a spool. The filaments pass through the center of the yarn spool and the spool rotates to wrap the yarn about the filaments.

In U.S. Pat. No. 3,780,514, Rodermund et al. describe a method of manufacturing wreaths and the like from flat sheet material and twisted wire. Another Rodermund et al. patent, U.S. Pat. No. 3,942,310, discloses a garland manufacturing machine where winding strands are formed into a tube and then cut to produce the garland.

U.S. Pat. No. 4,964,932 by Miller describes the manufacture of a decorative garland by wrapping continuous fibers about a frame and cutting the resulting tube to produce the garland.

Kalm et al., in U.S. Pat. No. 5,194,063, discloses a garland maker that has an arm that rotates about an axis. The arm includes an opening to feed a core wire for the garland and another opening to feed the wrapping wire to secure the evergreen bough as the arm rotates.

Carmichael, in U.S. Pat. No. 5,247,729, describes a wreath-making machine that wires bundles of evergreen boughs to a circular wreath frame. In U.S. Pat. No. 5,421,140, Theriault discloses an evergreen tree compressing and wrapping machine that employs a plastic netting to hold the tree in a compressed state. A recent patent by Kilbane, U.S. Pat. No. 5,829,490, shows a mechanical apparatus for making a wire wreath ring to which evergreen boughs are easily attached.

All of the above devices are limited in the length of an evergreen bough garland that can be produced during a single run. Applicant has invented a bough roping device that overcomes many of the difficulties present in the above devices.

SUMMARY OF THE INVENTION

The invention is directed to a bough roping machine for fastening multiple evergreen boughs to a wire to form a linear garland used for decoration. The machine includes a support base with a vertical frame member secured to the support base member. The frame member has a planar disk member rotatably supported vertically therein, with the disk member including a center aperture there through. A power means is operatively connected to the disk member for rotating the disk member relative to the frame and base members. A spool support member is secured to the support base member, with the spool support member including a hollow bearing shaft member rotatably secured thereto with the central axis of the hollow bearing shaft member perpendicular to the vertical disk member and centered on the disk aperture. The bearing shaft member is adapted for holding a spool of wrapping wire thereon. A plate member is secured to the hollow bearing shaft member, and a rigid connecting member is fastened between the plate member and the planar disk member for synchronous rotation of the plate and disk members. A biasing means is adapted for frictionally engaging the plate member with a spool of wrapping wire positioned on the spool support hollow bearing shaft member for synchronous rotation of the plate member and the spool of wrapping wire.

Wire guide means is present for feeding wrapping wire from the spool positioned on the spool support hollow bearing shaft member to a location on the planar disk member adjacent the disk aperture. A tensioning means maintains tension on the wrapping wire from the spool. A core wire fed through the hollow bearing shaft member and the planar disk member center aperture, and evergreen boughs inserted into the disk aperture are secured to the core wire at the disk member aperture by synchronous rotation of the planar disk member, the plate member and the spool member, with a wrapping wire supplied from the spool, through the wire guide means and tensioning means and to the disk aperture, to continuously encircle and wrap around boughs and the core wire in the disk aperture.

DESCRIPTION OF THE EMBODIMENTS
Nomenclature

Figure 1:
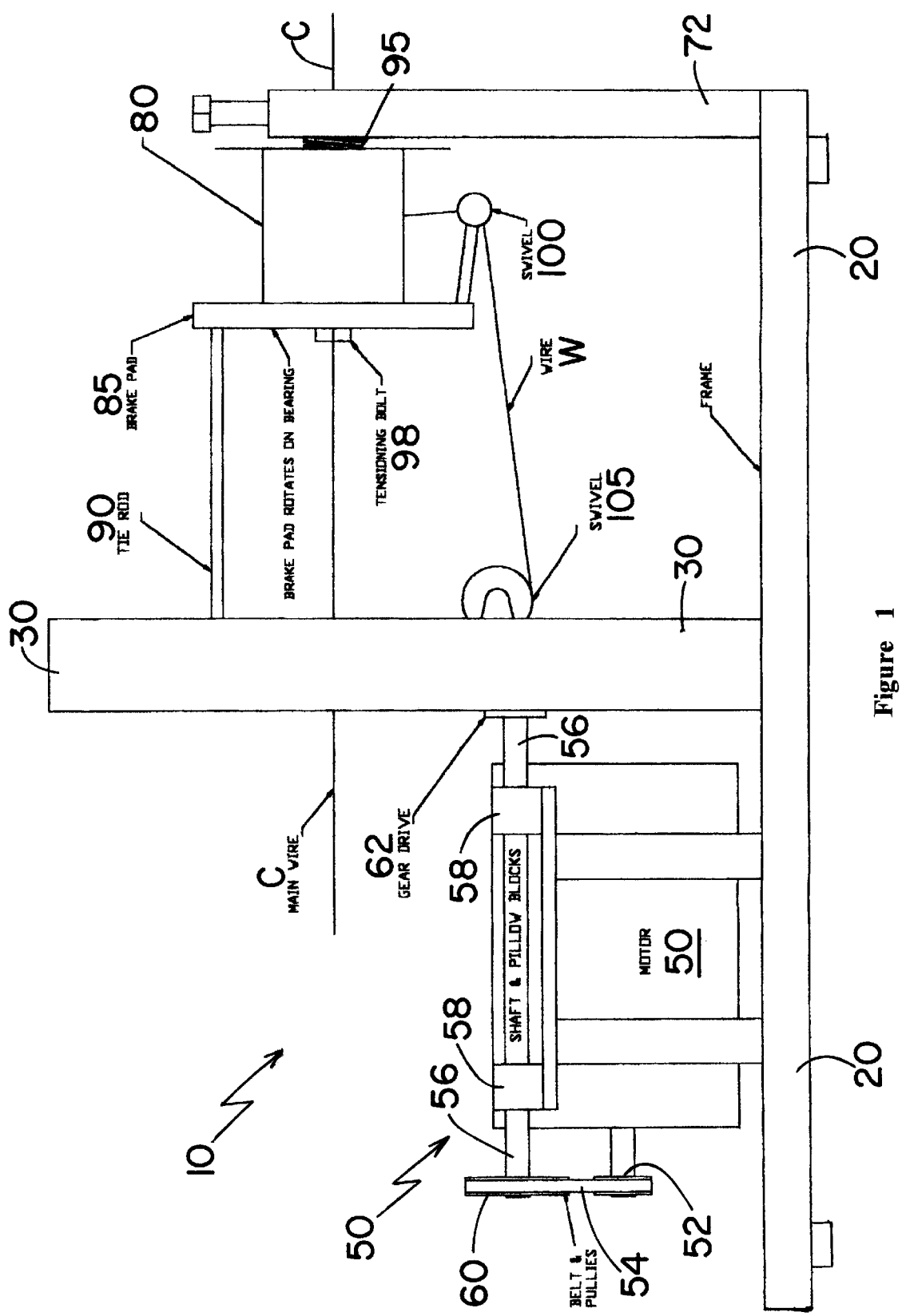
FIG. 1 is a plan side schematic view of one embodiment of the bough roping machine of the present invention.
Figure 2:
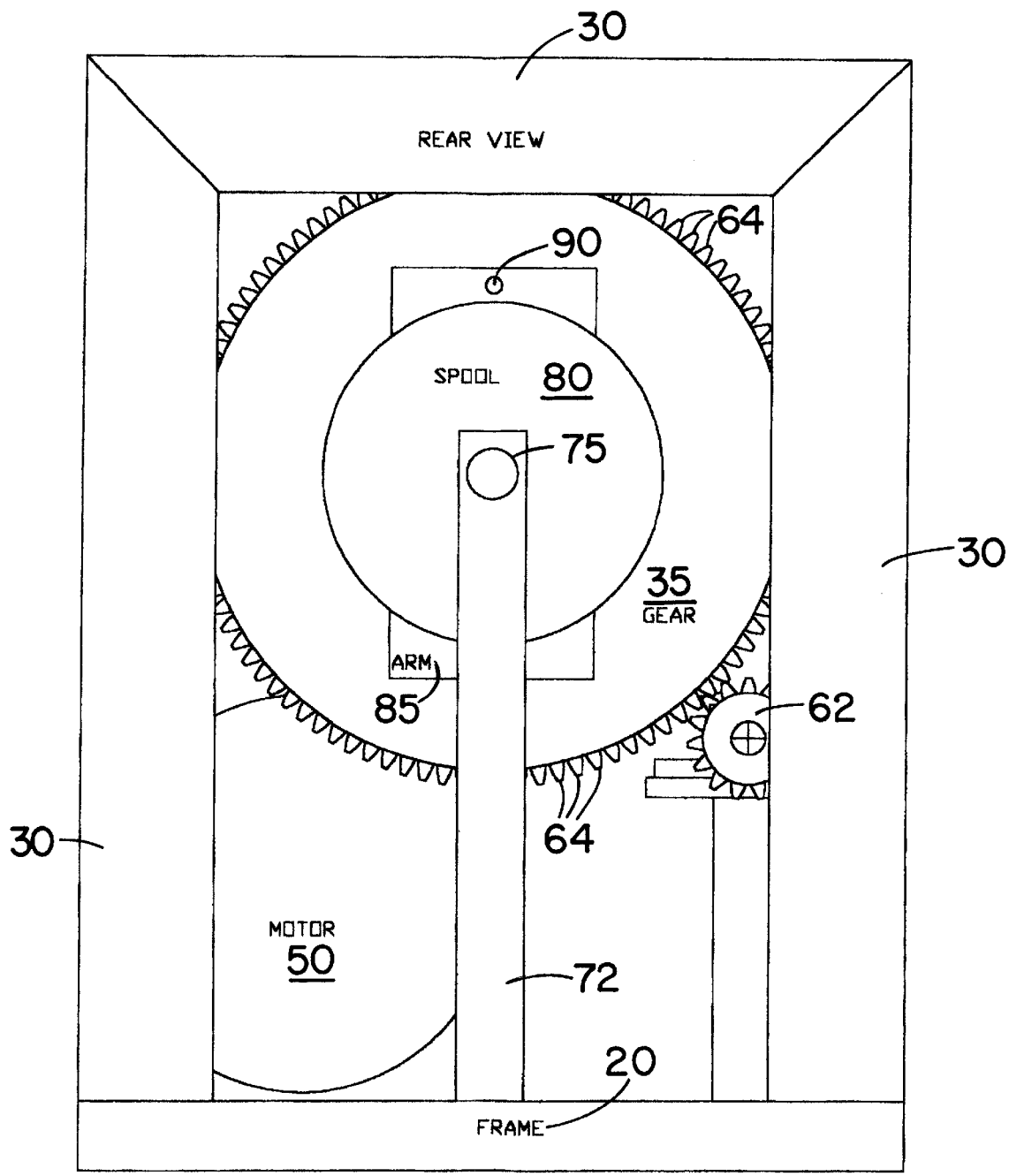
FIG. 2 is a plan end schematic view from the spool support end of one embodiment of the bough roping machine of the present invention.
Figure 3:
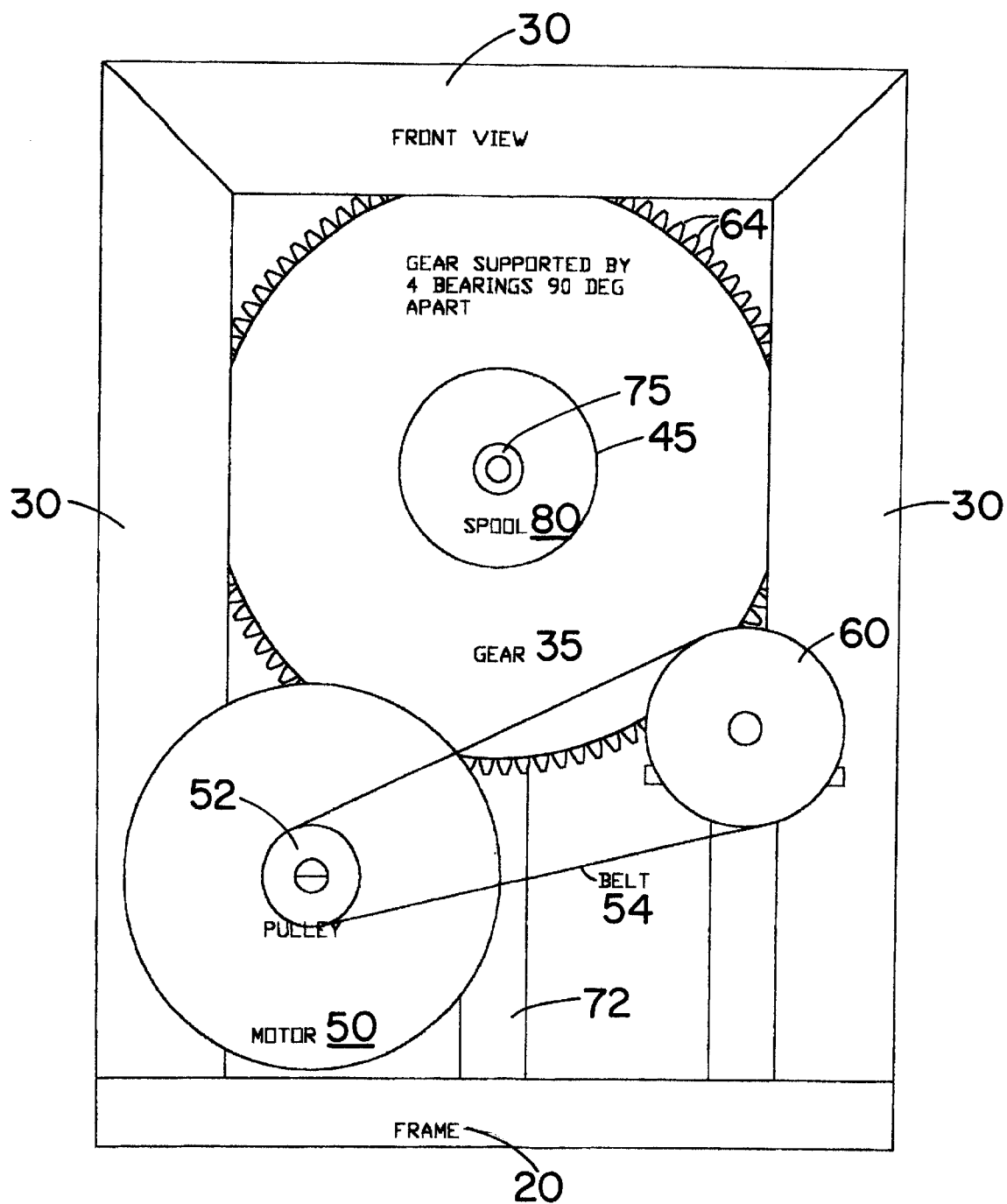
FIG. 3 is a plan end schematic view from the opposite end of one embodiment of the bough roping of the present invention.
Figure 4:
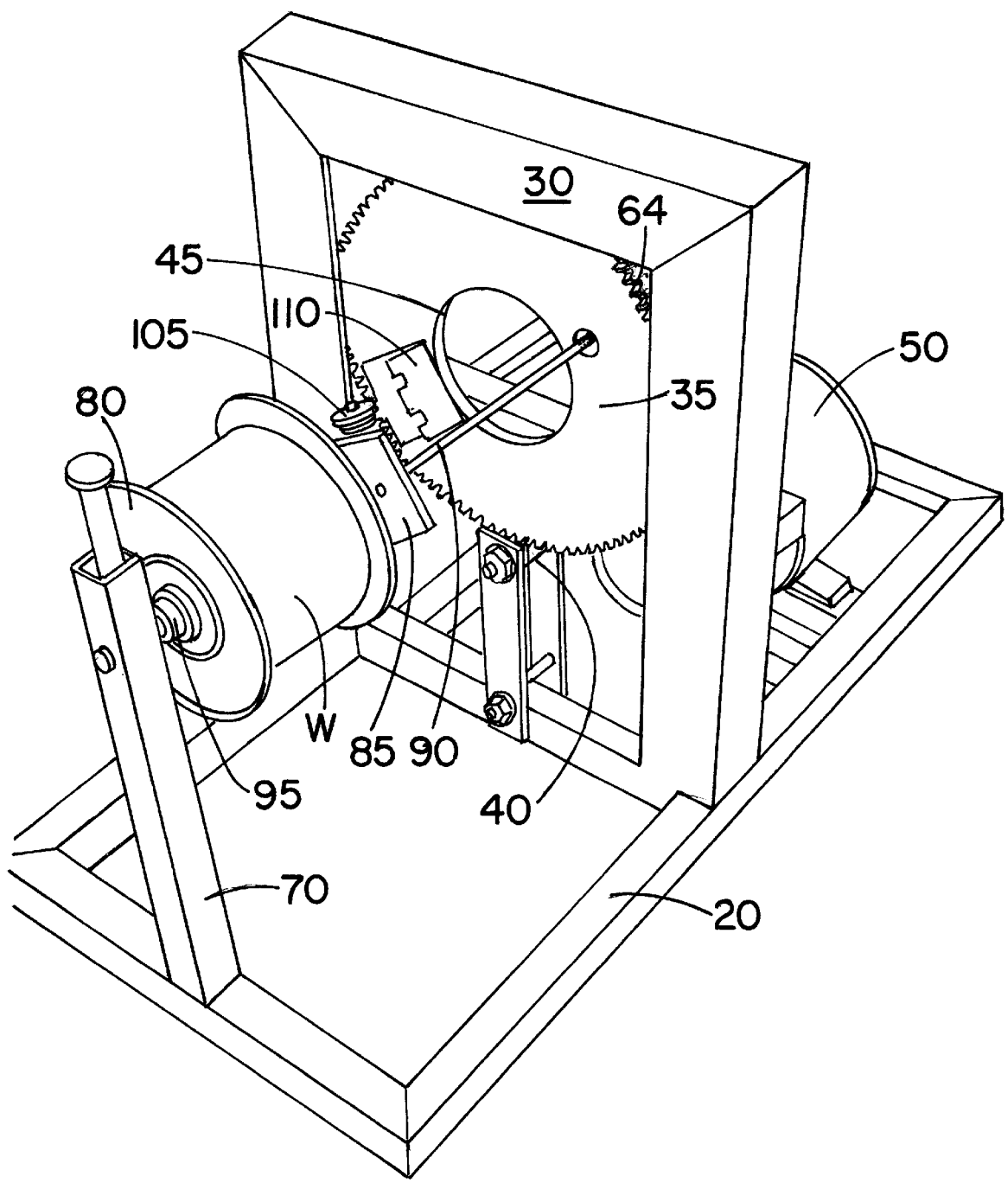
FIG. 4 is an elevational perspective view of one embodiment of the bough roping machine of the present invention.
Figure 5:
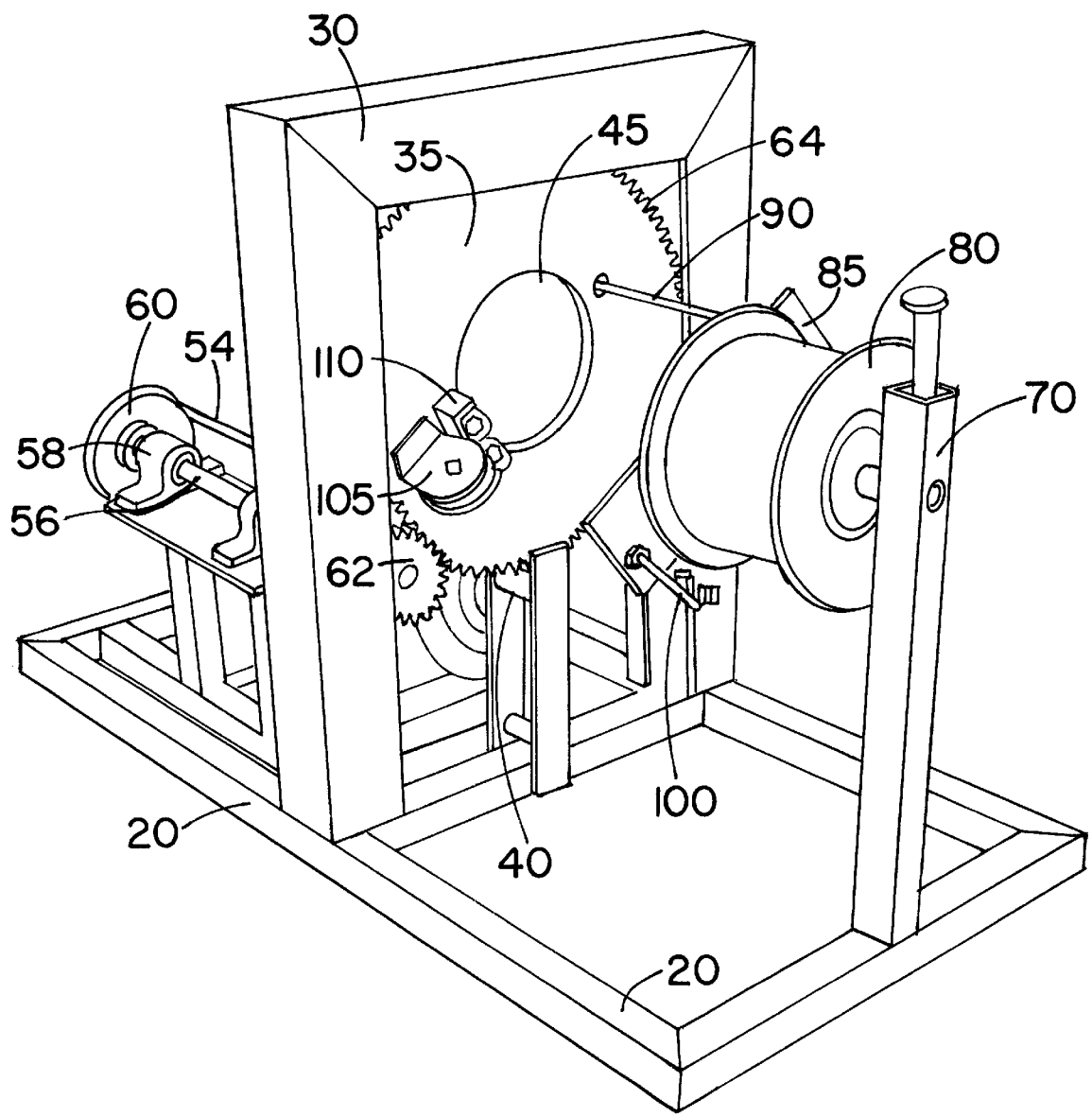
FIG. 5 is another elevational perspective view of one embodiment of the bough roping machine of the present invention.
Figure 6:
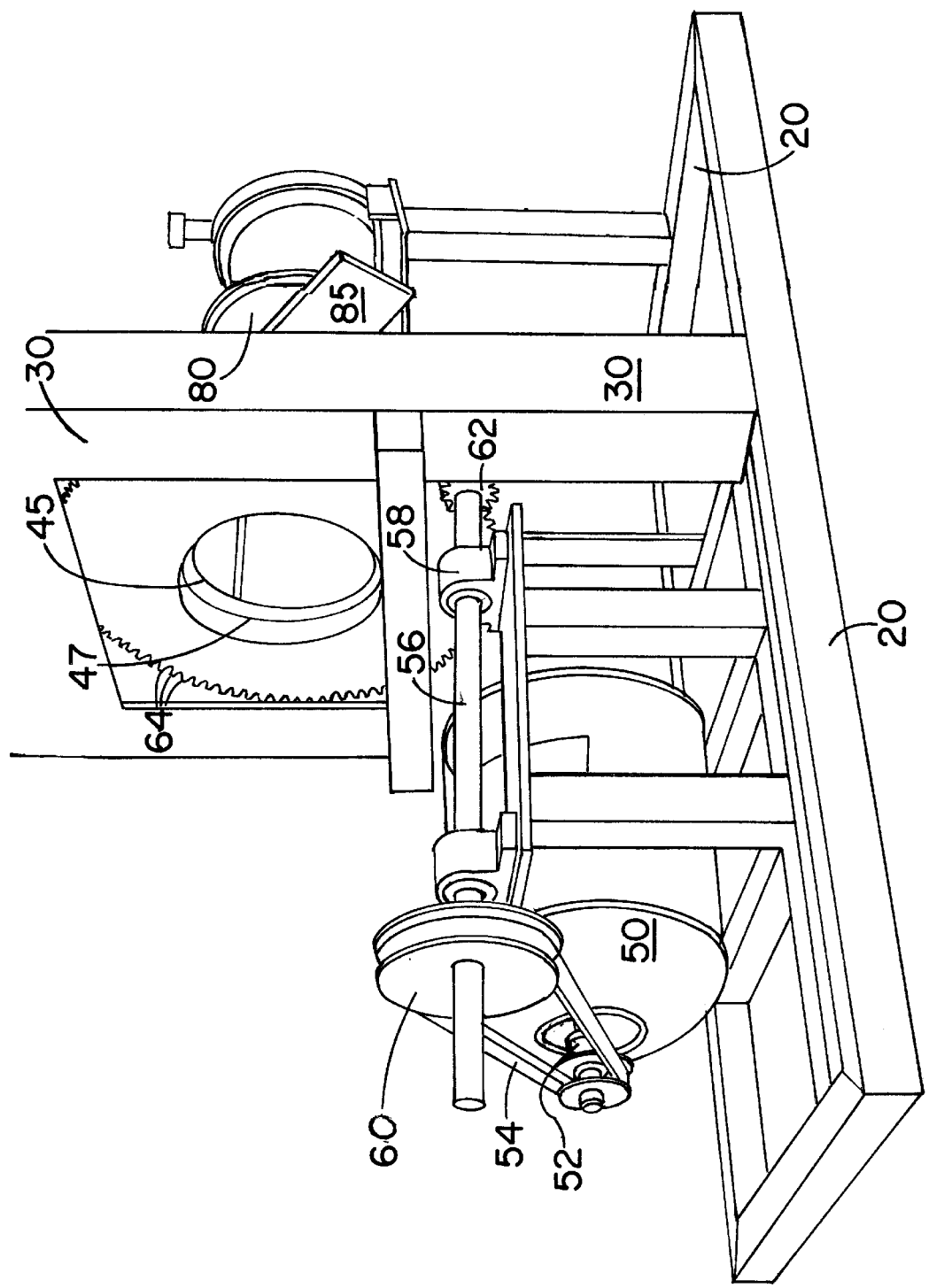
FIG. 6 is another elevational perspective view of one embodiment of the bough roping machine of the present invention.
Figure 7:
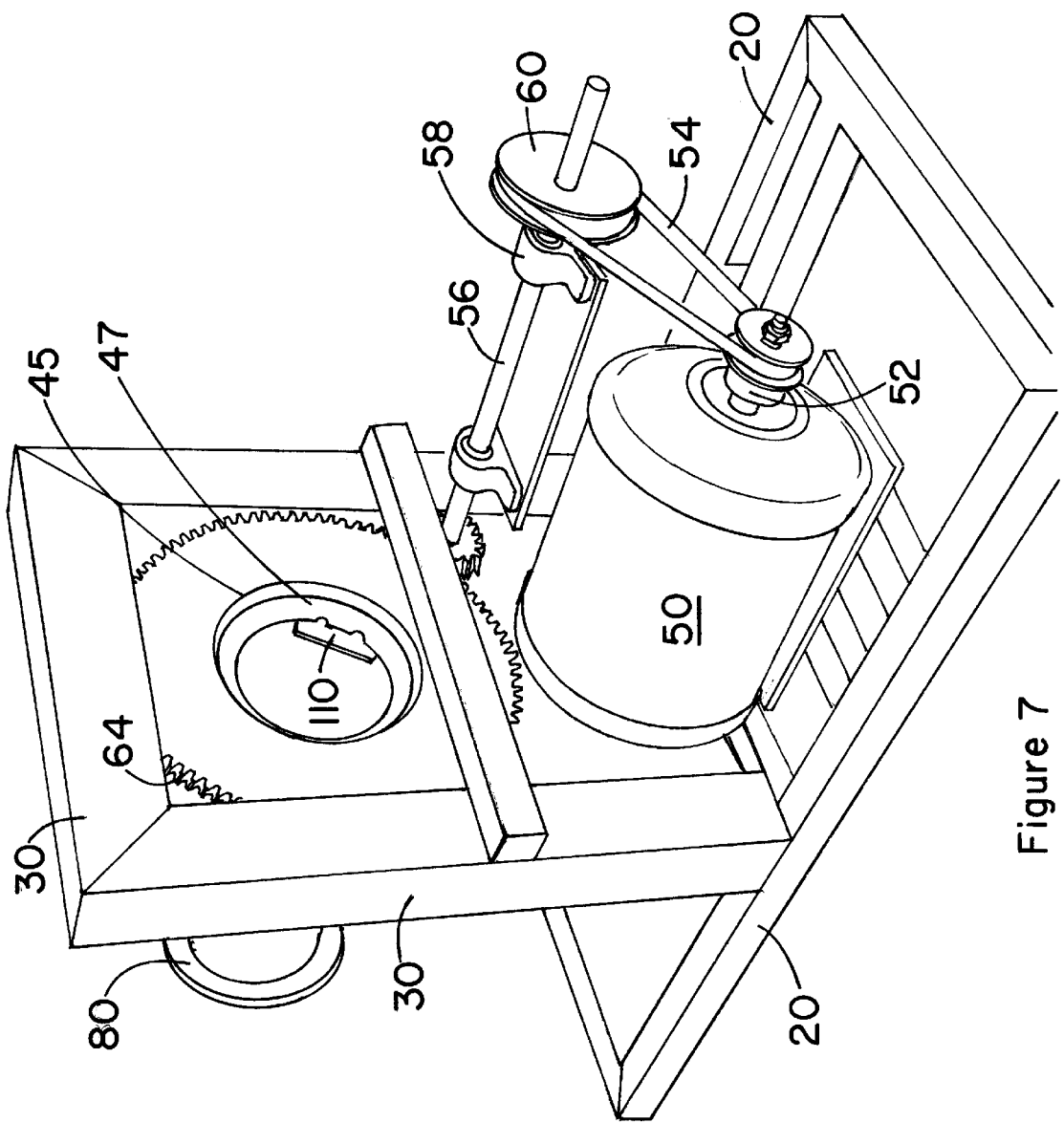
FIG. 7 is another elevational perspective view of one embodiment of the bough roping machine of the present invention.
Figure 8:
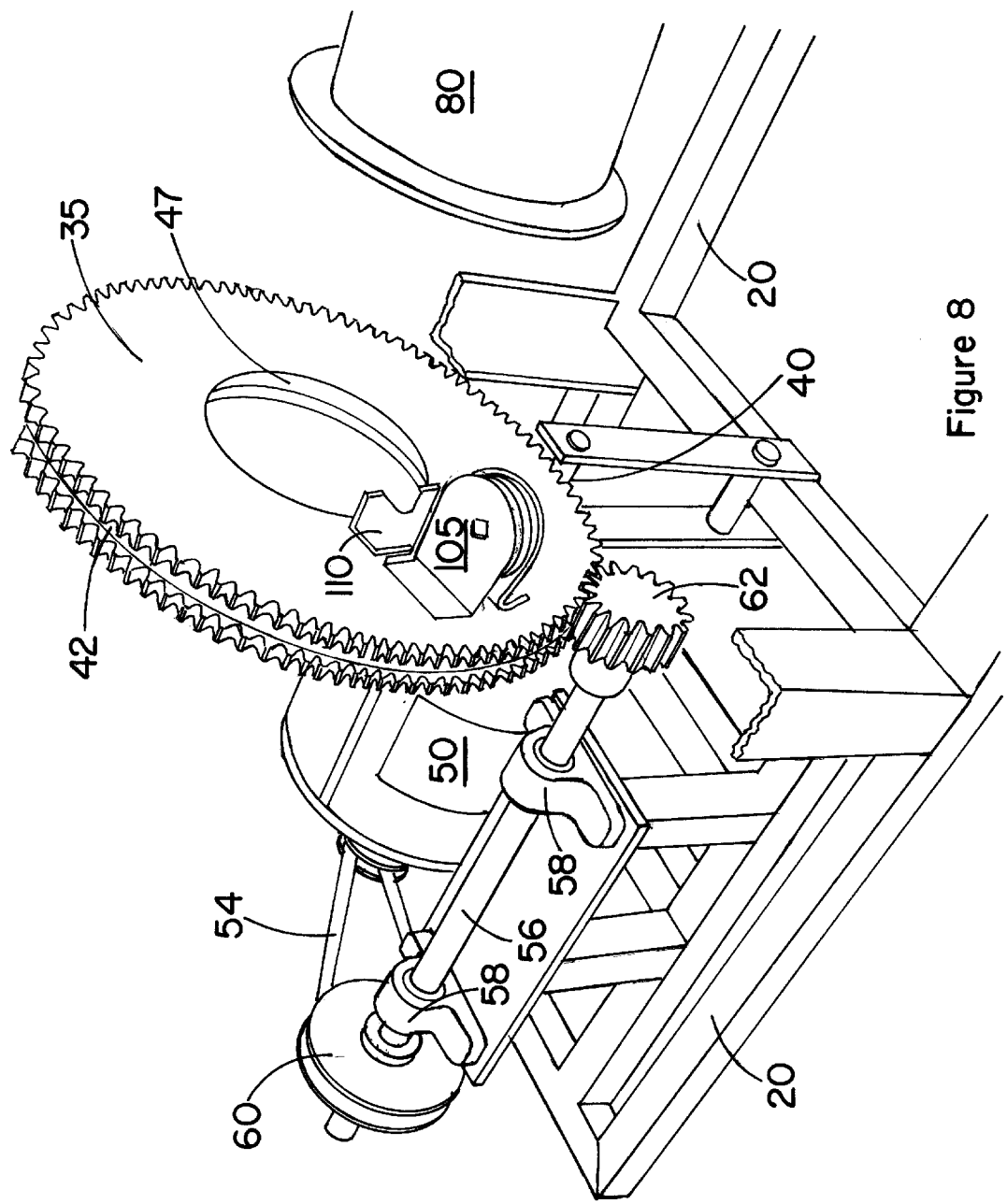
FIG. 8 is an elevational perspective view of the planar disk member of the present invention with the vertical frame member removed.

10 Bough Roping Machine
20 Support Base Member
30 Vertical Frame Member
35 Planar Disk Member
40 Roller Support Members
42 Circumferential Channel in Disk Member
45 Center Aperture of Disk Member
47 Tapered Edge of Center Aperture
50 Electric Motor Power Member
51 Drive Train Assembly
52 Motor Shaft and Pulley
54 Belt Member
56 Drive Shaft Member
58 Bearings for Drive Shaft
60 Drive Shaft Pulley
62 Drive Shaft Gear
64 Teeth of Vertical Disk Member
70 Spool Support Member
72 Vertical Post Member
75 Hollow Bearing Shaft Member
80 Spool of Wrapping Wire
85 Plate Member
90 Rigid Connecting Rod Member
95 Biasing Spring Member
98 Biasing Adjustment Nut Member
100 Swivel Pulley of Plate Member
105 Swivel Pulley of Disk Member
110 Tensioning Device
120 Cover Plate for Motor and Drive Shaft
A Axis of Hollow Bearing Shaft Member
C Core Wire
W Wrapping Wire
B Evergreen Bough Construction Referring to FIGS. 1–8, one embodiment of the bough roping machine 10 of the present invention is shown. The bough roping machine 10 includes a support base member 20 that is preferably rectangular and planar in structure. There is a vertical frame member 30 secured to the support base member 20 about at the midpoint thereof. The frame member 30 has a planar disk member 35 rotatably supported vertically therein. The planar disk member 35 preferably has a circumferential channel 42 that rides on a plurality of roller support members 40 secured to the frame member 30 by bearing means (not shown). The roller support members 40 are preferably positioned at 90 degree intervals around the planar disk member 35 and fastened to the frame member 30 with bolts, as shown in FIGS. 4–8. The planar disk member 35 includes a center aperture 45 there through, with the aperture unobstructed by the vertical frame member 30. Preferably, the planar disk member 35 has a tapered edge 47 adjacent the center aperture 45, as seen in FIGS. 6–8, for purposes described below.

A power means is operatively connected to the planar disk member 35 for rotating the disk member 35 relative to the frame member 30 and the base member 20. The power means includes, for example, an electric motor 50 with a drive train assembly 51 operatively connected to the planar disk member 35. The electric motor member 50 is secured to the base member 20, with the motor member 50 having a motor shaft and pulley 52. The motor member 50 with shaft and pulley 52 rotates a drive shaft member 56 by means of a belt member 54 encircling a drive shaft pulley 60, with the drive shaft member 56 fastened on the support base member 20 by pillow block bearings 58. The drive shaft member 56 also includes a drive shaft gear member 62 that meshes with teeth 64 on the circumference of the planar disk member 35. Preferably, the planar disk member 35 has teeth 64 on both sides of the circumferential channel 42. Thus, the electric motor member 50 rotates the drive shaft member 56, which turns the gear member 62, thereby rotating the planar disk member 35 supported by the roller support members 40 in the vertical frame member 30. The above described motor and drive shaft assembly is just one example of a power means for rotating the planar disk member 35 relative to the frame member 30. Many other power means can be envisioned that accomplish the described planar disk member rotation task.

A spool support member 70 is secured to the support base member 20 opposite the power means motor 50 and drive shaft assembly. The spool support member 70 includes a vertical post member 72 and a hollow bearing shaft member 75, rotatably secured thereto. The hollow bearing shaft member 75 has a central axis A oriented perpendicular to the vertical frame member 30 and planar disk member 35 therein, with the central axis A of the hollow shaft member 75 centered on the disk aperture 45. The hollow bearing shaft member 75 is adapted for holding a spool 80 of wrapping wire W thereon.

A plate member 85 is secured to the hollow bearing shaft member 75 adjacent the planar disk member 35, with the plate member 85 oriented perpendicular to the shaft member 75. A rigid connecting rod member 90 is fastened between the plate member 85 and the planar disk member 35 for synchronous rotation of the plate and disk members. A biasing means, for example, a biasing spring member 95, is adapted for frictionally holding the plate member 85 to the spool 80 of wrapping wire W positioned on the spool support hollow bearing shaft member 75. The biasing spring member 95 preferably encircles the hollow shaft member 75 and is positioned adjacent the spool 80 of wrapping wire W and opposite the plate member 85, with the biasing spring member 95 between the spool support member 70 and the spool 80. An adjustment nut member 98 on the hollow shaft member 75, adjacent the plate member 85, is employed to maintain and adjust the friction holding the plate member 85 to the spool 80 of wrapping wire W.

Also present is a wire guide means for feeding wrapping wire W from the spool 80 positioned on the spool support hollow bearing shaft member 75 to a location on the planar disk member 35 adjacent the disk aperture 45, best seen in FIG. 5. The wire guide means includes, for example, a swivel pulley member 100 secured to the plate member 85 and another swivel pulley member 105 secured to the disk member 35. With the rigid connecting rod member 90 holding the plate member 85 and planar disk member 35 in register on one side, as shown in FIGS. 4 and 5, the swivel pulley members 100, 105 are preferably positioned opposite the rigid connecting rod member 90, as seen in these two FIGS. A tensioning means, for example, a plastic block 110, is secured to the planar disk member 35 adjacent the center aperture 45 for maintaining tension on the wrapping wire W from the spool 80, as the wrapping wire W encircles the core wire C and boughs B.

In the operation of preparing an evergreen bough garland, a core wire C is fed through the hollow bearing shaft member 75 and through the planar disk member center aperture 45. The wrapping wire W is secured to the core wire C near the disk member center aperture 45, and the power means is activated to rotate the disk member 35, the connected plate member 85 and the biased spool member 80. Evergreen boughs B are inserted into the disk aperture 45 from the side opposite the spool 80, and are secured to the core wire C at the disk member aperture 45 by synchronous rotation of the planar disk member 35, the rigid rod member 90, the connected plate member 85 and the spool member 80. The wrapping wire W is supplied from the spool member 80, through the wire guide means 100, 105 and the tensioning means 110 and to the disk aperture 45, to continuously encircle and wrap around boughs B and core wire C in the disk aperture. The completed evergreen bough garland moves away from the planar disk member 35, opposite the spool support member 85, as each bough is incorporated into the garland. The electric motor member 50 is equipped with a foot pedal control for use by the operator, leaving both hands of the operator free for handling boughs. In a preferred embodiment of the invention, the disk member center aperture 45 includes a larger aperture diameter opposite the spool support member 70 in order to produce a tapered aperture 45 in the disk member 35. The tapered aperture further guides the evergreen boughs B onto the core wire C for faster production of a garland by the operator.

The bough roping machine 10 of the present invention offers numerous advantages over other machines presently in use. Other machines routinely carry the wrapping wire on a spool that is attached to the vertical rotating disk member. Thus, the spool is necessarily of limited size to prevent an imbalance of the disk and spool combination as the disk rotates. The limited spool capacity requires frequent work stoppage to replace an empty spool 80 with a filled wrapping wire spool 80.

The bough roping machine 10 of the present invention maintains the wrapping wire spool 80 separate from the rotating planar disk member 35, thereby allowing for use of larger spools with greater lengths of wrapping wire W, thus providing for extended working runs before replenishing the wrapping wire spool 80.

The wrapping wire spool 80 rotates with the plate member 85 and the planar disk member 35, feeding the wrapping wire W through the wire guide means 100, 105 and the tensioning means 110 to the core wire C. The wire spool 80 also slowly slips with respect to the plate member 85 as the wrapping wire W is used to encircle the core wire C and evergreen boughs B of the formed garland. The biasing means that frictionally holds the plate member 85 to the spool 80 provides for this slow slipping of the spool 80. The tensioning device 110 on the planar disk member 35 is adjustable to provide the desired tensioning of the wrapping wire W as it encircles the boughs B and core wire C.

Figure 9:
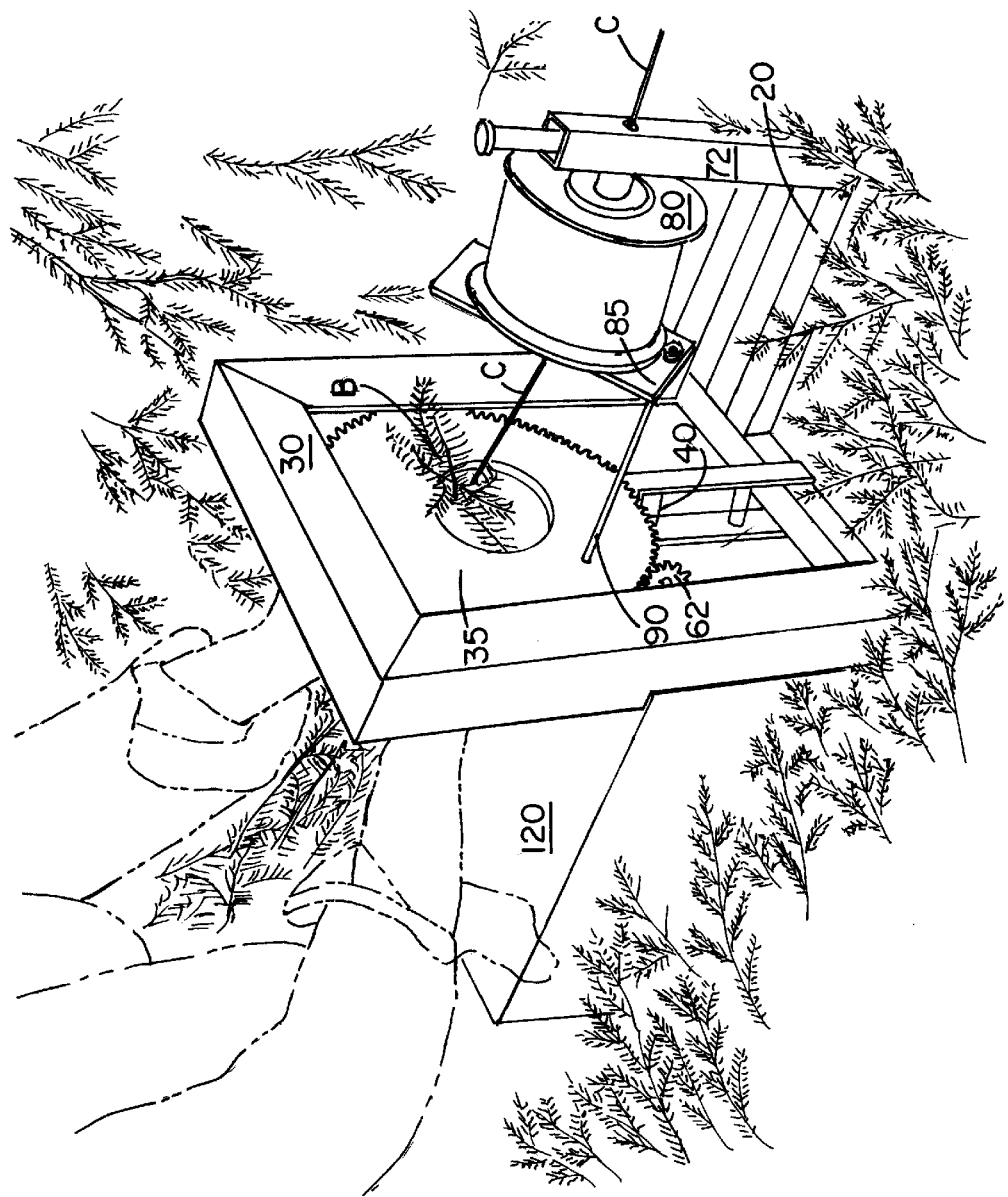
FIG. 9 is an elevational perspective view of an operator attaching a bough to the core wire using one embodiment of the bough roping machine of the present invention.

In a preferred embodiment of the invention, shown in FIG. 9, the motor 50 and drive train assembly is provided with a rigid covering 120 to protect the operator from contact/injury by the drive train assembly. The covering 120 also prevents evergreen boughs B from becoming entangled in the drive train assembly.

While the invention has been particularly shown and described with reference to preferred embodiments thereof, it will be understood by those skilled in the art that various changes in form and details may be made therein without departing from the spirit and scope of the invention.

I claim:

1. A bough roping machine comprising;
   (a) a support base member;
   (b) a vertical frame member secured to the support base member, the frame member having a planar disk member rotatably supported vertically therein, the disk member including a center aperture there through;
   (c) a power means operatively connected to the disk member for rotating the disk member relative to the frame and base members;
   (d) a spool support member secured to the support base member, the spool support member including a hollow bearing shaft member rotatably secured thereto with the central axis of the hollow bearing shaft member perpendicular to the vertical disk member and centered on the disk aperture, the bearing shaft member adapted for holding a spool of wrapping wire thereon;
   (e) a plate member secured to said hollow bearing shaft member, and a rigid connecting member fastened between the plate member and the planar disk member for synchronous rotation of the plate and disk members;
   (f) a biasing means adapted for frictionally engaging the plate member with a spool of wrapping wire positioned on the spool support hollow bearing shaft member for synchronous rotation of the plate member and a spool of wrapping wire;
   (g) wire guide means for feeding wrapping wire from a spool positioned on the spool support hollow bearing shaft member to a location on the planar disk member adjacent the disk aperture; and
   (g) tensioning means for maintaining tension on the wrapping wire from the spool; whereby a core wire fed through the hollow bearing shaft member and the planar disk member center aperture, and evergreen boughs inserted into the disk aperture are secured to the core wire at the disk member aperture by synchronous rotation of the planar disk member, the plate member and the spool member, with a wrapping wire supplied from the spool, through the wire guide means and tensioning means and to the disk aperture, to continuously encircle and wrap around boughs and core wire in the disk aperture.

2. The bough roping machine according to claim 1 wherein, the planar disk member is vertically supported by a plurality of wheeled bearings secured to the vertical frame member.

3. The bough roping machine according to claim 2 wherein, the wheeled bearings contact a channel in an outer circumferential edge of the planar disk member.

4. The bough roping machine according to claim 1 wherein, the power means operatively connected to the disk member includes an electrically powered motor operatively connected to a drive shaft having a drive gear adapted for rotating the planar disk member.

5. The bough roping machine according to claim 4 wherein, the planar disk member includes at least one toothed circumferential edge for meshing with the drive gear of the drive shaft.

6. The bough roping machine according to claim 1 wherein, the biasing member adapted for frictionally engaging the plate member with a spool includes a compressible spring member encircling the hollow bearing shaft member adjacent the spool and opposite the plate member.

7. The bough roping machine according to claim 1 wherein, the wire guide means for feeding wrapping wire from the spool to the disk member includes a pulley member secured to the plate member and a pulley member secured to the planar disk member surface adjacent the spool support member.

8. The bough roping machine according to claim 1 wherein, the tensioning means for maintaining tension on the wrapping wire includes a block member fastened to the planar disk member surface adjacent the spool support member, with the wrapping wire held between the block member and the disk member adjacent surface.

9. The bough roping machine according to claim 1 wherein, the planar disk member center aperture includes a larger aperture diameter opposite the spool support member to produce a tapered aperture in the disk member.

10. A bough roping machine comprising;
(a) a support base member;
(b) a vertical frame member secured to the support base member, the frame member having a planar disk member rotatably supported vertically therein, the disk member including a center aperture there through;
(c) a power means operatively connected to the disk member for rotating the disk member relative to the frame and base members;
(d) a spool support member secured to the support base member, the spool support member including a hollow bearing shaft member rotatably secured thereto with the central axis of the hollow bearing shaft member perpendicular to the vertical disk member and centered on the disk aperture, the bearing shaft member adapted for holding a spool of wrapping wire thereon;
(e) a plate member secured to said hollow bearing shaft member, and a rigid connecting member fastened between the plate member and the planar disk member for synchronous rotation of the plate and disk members;
(f) a biasing means including a compressible spring member encircling the hollow bearing shaft member adjacent the spool and opposite the plate member, adapted for frictionally engaging the plate member with the spool of wrapping wire positioned on the spool support hollow bearing shaft member, for synchronous rotation of the plate member and the spool of wrapping wire;
(g) wire guide means including a pulley member secured to the plate member and a pulley member secured to the planar disk member surface adjacent the spool support member, for feeding wrapping wire from a spool positioned on the spool support hollow bearing shaft member to a location on the planar disk member adjacent the disk aperture; and
(h) tensioning means for maintaining tension on the wrapping wire from the spool; whereby a core wire fed through the hollow bearing shaft member and the planar disk member center aperture, and evergreen boughs inserted into the disk aperture are secured to the core wire at the disk member aperture by synchronous rotation of the planar disk member, the plate member and the spool member, with a wrapping wire supplied from the spool, through the wire guide means and tensioning means and to the disk aperture, to continuously encircle and wrap around boughs and core wire in the disk aperture.

11. The bough roping machine according to claim 10 wherein, the planar disk member is vertically supported by a plurality of wheeled bearings secured to the vertical frame member.

12. The bough roping machine according to claim 11 wherein, the wheeled bearings contact a channel in an outer circumferential edge of the planar disk member.

13. The bough roping machine according to claim 11 wherein, the power means operatively connected to the disk member includes an electrically powered motor operatively connected to a drive shaft having a drive gear adapted for rotating the planar disk member.

14. The bough roping machine according to claim 13 wherein, the planar disk member includes at least one toothed circumferential edge for meshing with the drive gear of the drive shaft.

15. The bough roping machine according to claim 10 wherein, the tensioning means for maintaining tension on the wrapping wire includes a block member fastened to the planar disk member surface adjacent the spool support member, with the wrapping wire held between the block member and the disk member adjacent surface.

16. The bough roping machine according to claim 10 wherein, the planar disk member center aperture includes a larger aperture diameter opposite the spool support member to produce a tapered aperture in the disk member.

17. A bough roping machine comprising;
(a) a support base member;
(b) a vertical frame member secured to the support base member, the frame member having a planar disk member rotatably supported vertically therein by a plurality of wheeled bearings secured to the vertical frame member, the wheeled bearings contacting a channel in an outer circumferential edge of the planar disk member, the disk member including a center aperture there through;
(c) a power means operatively connected to the disk member for rotating the disk member relative to the frame and base members;
(d) a spool support member secured to the support base member, the spool support member including a hollow bearing shaft member rotatably secured thereto with the central axis of the hollow bearing shaft member perpendicular to the vertical disk member and centered on the disk aperture, the bearing shaft member adapted for holding a spool of wrapping wire thereon;
(e) a plate member secured to said hollow bearing shaft member, and a rigid connecting member fastened between the plate member and the planar disk member for synchronous rotation of the plate and disk members;

(f) a biasing means including a compressible spring member encircling the hollow bearing shaft member adjacent the spool and opposite the plate member, adapted for frictionally engaging the plate member with the spool of wrapping wire positioned on the spool support hollow bearing shaft member, for synchronous rotation of the plate member and the spool of wrapping wire;

(g) wire guide means including a pulley member secured to the plate member and a pulley member secured to the planar disk member surface adjacent the spool support member, for feeding wrapping wire from a spool positioned on the spool support hollow bearing shaft member to a location on the planar disk member adjacent the disk aperture; and (h) tensioning means for maintaining tension on the wrapping wire from the spool; whereby a core wire fed through the hollow bearing shaft member and the planar disk member center aperture, and evergreen boughs inserted into the disk aperture are secured to the core wire at the disk member aperture by synchronous rotation of the planar disk member, the plate member and the spool member, with a wrapping wire supplied from the spool, through the wire guide means and tensioning means and to the disk aperture, to continuously encircle and wrap around boughs and core wire in the disk aperture.

18. The bough roping machine according to claim 17 wherein, the power means operatively connected to the disk member includes an electrically powered motor operatively connected to a drive shaft having a drive gear adapted for rotating the planar disk member.

19. The bough roping machine according to claim 18 wherein, the planar disk member includes at least one toothed circumferential edge for meshing with the drive gear of the drive shaft.

20. The bough roping machine according to claim 17 wherein, the tensioning means for maintaining tension on the wrapping wire includes a block member fastened to the planar disk member surface adjacent the spool support member, with the wrapping wire held between the block member and the disk member adjacent surface.

21. The bough roping machine according to claim 17 wherein, the planar disk member center aperture includes a larger aperture diameter opposite the spool support member to produce a tapered aperture in the disk member.

* * * * *